US007610810B2

(12) United States Patent
Winker

(10) Patent No.: US 7,610,810 B2
(45) Date of Patent: Nov. 3, 2009

(54) METHODS FOR PRODUCING ACOUSTIC SOURCES

(75) Inventor: Douglas Frank Winker, Austin, TX (US)

(73) Assignee: Ets-Lindgren, L.P., Cedar Park, TX (US)

(*) Notice: Subject to any disclaimer, the term of this patent is extended or adjusted under 35 U.S.C. 154(b) by 39 days.

(21) Appl. No.: 12/008,404

(22) Filed: Jan. 10, 2008

(65) Prior Publication Data

US 2009/0178878 A1 Jul. 16, 2009

(51) Int. Cl.
*G01N 29/00* (2006.01)

(52) U.S. Cl. .......................... 73/571; 73/585; 73/589; 181/30; 181/148; 181/175; 181/196; 181/198; 381/58; 381/59

(58) Field of Classification Search .................. 181/30, 181/148, 151, 153, 155, 175, 179, 196, 198; 381/58, 59; 73/571, 585, 589
See application file for complete search history.

(56) References Cited

U.S. PATENT DOCUMENTS 3,295,133 A * 12/1966 Emerson et al. ................ 342/4
3,410,363 A * 11/1968 Schwartz .................... 356/450
3,876,035 A * 4/1975 Eckel ......................... 181/198
4,357,499 A * 11/1982 Bruel .......................... 73/571
4,366,882 A * 1/1983 Parker ......................... 181/30
4,605,093 A * 8/1986 Karlen ....................... 181/295
4,732,039 A * 3/1988 Syed ........................... 73/589
5,631,661 A * 5/1997 Sanchez ..................... 343/703
5,780,785 A * 7/1998 Eckel ......................... 181/295
5,884,436 A * 3/1999 Ebbitt ........................ 52/79.4
6,082,490 A * 7/2000 Rowland .................... 181/295
6,119,521 A * 9/2000 Shivashankara et al. ....... 73/589
6,119,808 A * 9/2000 Steedman et al. ........... 181/295
6,371,240 B1 * 4/2002 Hayes et al. .................. 181/30

* cited by examiner

*Primary Examiner*—Jeffrey Donels
*Assistant Examiner*—Jeremy Luks
(74) *Attorney, Agent, or Firm*—Patrick Stellitano

(57) ABSTRACT

Embodiments include an acoustic source for use in a hemi-anechoic chamber comprising a source assembly and a waveguide assembly for producing sound outside of a measurement hemisphere and channeling the sound into the measurement hemisphere. A waveguide end from which sound emanates is positioned close to the reflecting plane of the chamber and can approximate a point source.

19 Claims, 8 Drawing Sheets

200

METHODS FOR PRODUCING ACOUSTIC SOURCES

FIELD

The present invention is in the field of acoustic sources.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

Figure 1B:
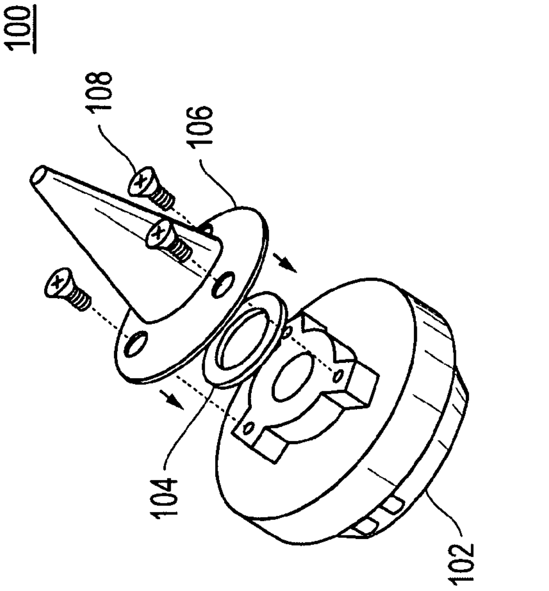
FIGS. 1A-B depicts a source comprising a compression driver and a throat adapter

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include an acoustic source for use in a hemi-anechoic chamber comprising a source assembly and a waveguide assembly for producing sound outside of a measurement hemisphere and channeling the sound into the measurement hemisphere. A waveguide end from which sound emanates is positioned close to the reflecting plane of the chamber and can approximate a point source.

Anechoic chambers may be used for a variety of purposes including testing devices. Herein are described sources for the qualification of hemi-anechoic and anechoic chambers. The sources are designed to meet the directionality requirements of ISO 3745:2003(E), a standard set by the International Standards Organization for the qualification of precision grade hemi-anechoic and anechoic chambers. In the prior art, techniques for qualifying the performance of hemi-anechoic chambers used multiple sources, and could not meet the requirements up to 20 kHz unless a source was mounted in the reflecting plane, meaning one had to put a speaker in the floor. The low frequency limit is governed by the low frequency limit of the compression driver. Sources as described herein meet the source directivity requirements of the ISO standard and lie completely above the reflecting plane.

One embodiment comprises a compression driver that emits an acoustic signal. The throat of the compression driver is connected to a throat adapter that channels the sound from the diameter of the compression driver to a much smaller diameter of the exit aperture of the throat adapter. For example, a 1 inch throat may be funneled down to a ¼ inch exit aperture. The compression driver and throat adapter are mounted within a pyramidal enclosure. The inside of the enclosure is lined with damping material and filled with sound absorbing material to absorb any sound that might radiate from the device other than from the exit aperture. One end of a waveguide assembly couples to the exit aperture of the throat adapter and channels the sound to the opposite end of the waveguide from which sound emanates. A tubing of damping material surrounds the waveguide to reduce the possibility of breakout noise. The tubing is used to guide the energy produced by the compression driver—which is positioned outside a measurement hemisphere—into the measurement hemisphere without disturbing the acoustic field inside the measurement hemisphere. If the compression driver was instead located within the measurement hemisphere, the directivity would be adversely affected and the source would not meet the ISO standard. Therefore, the source assembly is located outside the measurement area and the sound from the source assembly is guided into the measurement area by the waveguide.

The end of the waveguide from which sound emanates is positionable above the reflecting plane at an adjustable height. One may adjust the height so that the waveguide end is very close to the reflecting plane (less than a wavelength). According to acoustic image theory, the combination of the source and reflecting plane produces the same acoustic field as would be produced by the combination of the source and its image below the reflecting plane. The close proximity of the waveguide end to the reflecting plane places the acoustic center of the sound source directly at the reflecting surface. The proximity of the sound source to the reflecting surface and the small size of the opening creates the appearance of a near point source to meet the directivity requirement of the ISO standard.

Figure 1A:
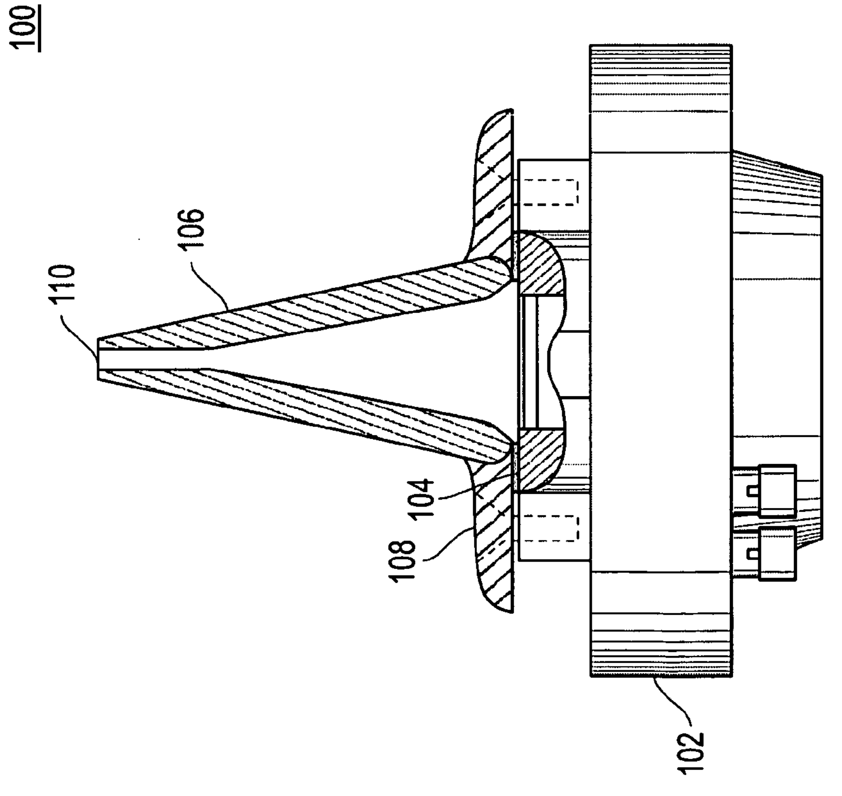
Figure 2A:
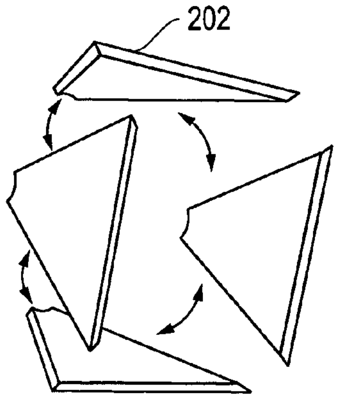
FIGS. 2A-D depicts an enclosure for the source of FIG. 1A-B
Figure 2C:
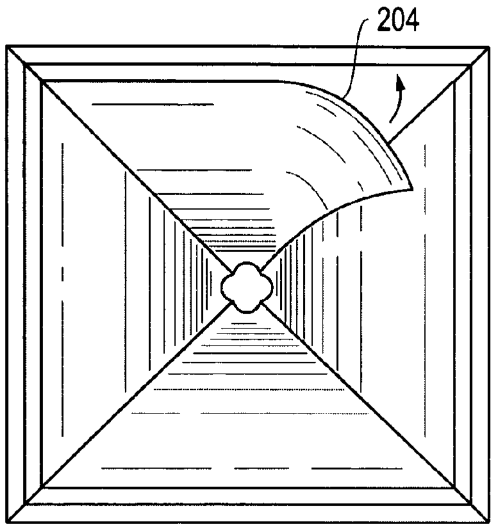
Figure 2B:
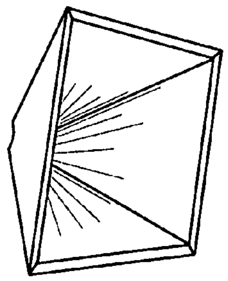
Figure 2D:
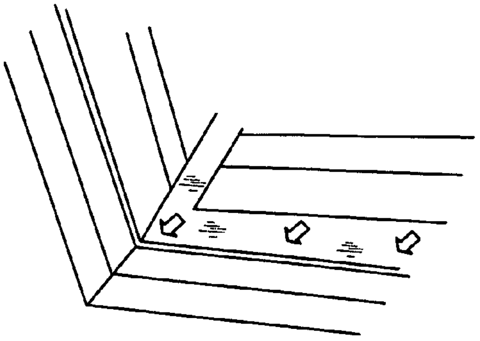

FIG. 1 shows an acoustic source partial assembly 100 for use in embodiments for generating an omni-directional acoustic source in a hemi-anechoic chamber. Acoustic source 100 comprises a compression driver 102. In one embodiment, this is a 1 inch compression driver although different sizes may be employed in other embodiments. Compression drivers of different sizes are commercially available. Acoustic source 100 comprises a gasket 104 that lies between the compression driver 102 and a throat adapter 106. Throat adapter 106 may be made of brass, for example. Throat adapter 106 is attached to the compression driver 102 by screws 108. Throat adapter 106 transitions from the throat of the compression driver 102 to the exit aperture 110 of the throat adapter which is much smaller than the throat of the compression driver. For example, in one embodiment, the throat of the compression driver is one inch and the exit aperture 110 of the throat adapter is ¼ inch. Note that the size of the exit aperture 110 may be varied according to the desired frequency performance of the source.

FIG. 2 shows an assembly of an enclosure 200 for source 100. FIG. 2A shows 4 pieces 202 assembled together as shown in FIG. 2B. Interior to the enclosure is placed an acoustic damping material 204 as shown in FIG. 2C. FIG. 2D shows a detail of the lip that supports the bottom of the enclosure 200.

Figure 3B:
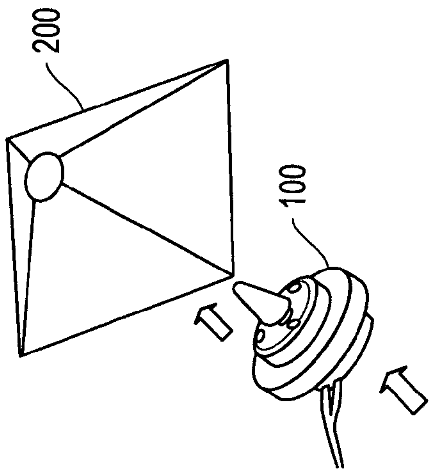
FIGS. 3A-B depicts a source assembly
Figure 3A:
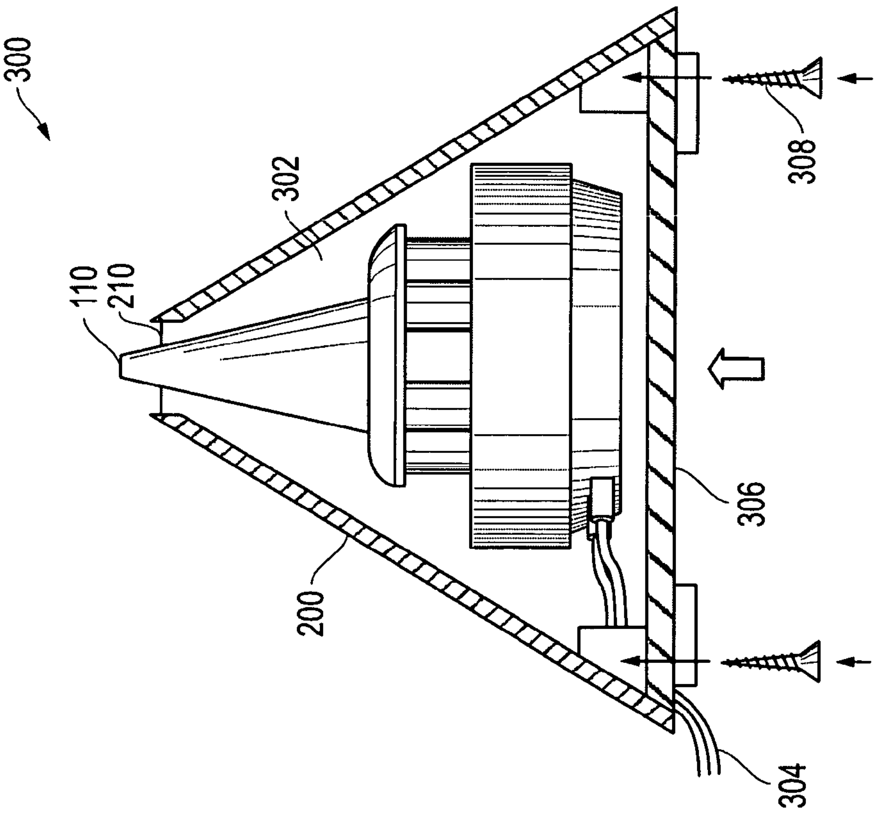
Figure 4A:
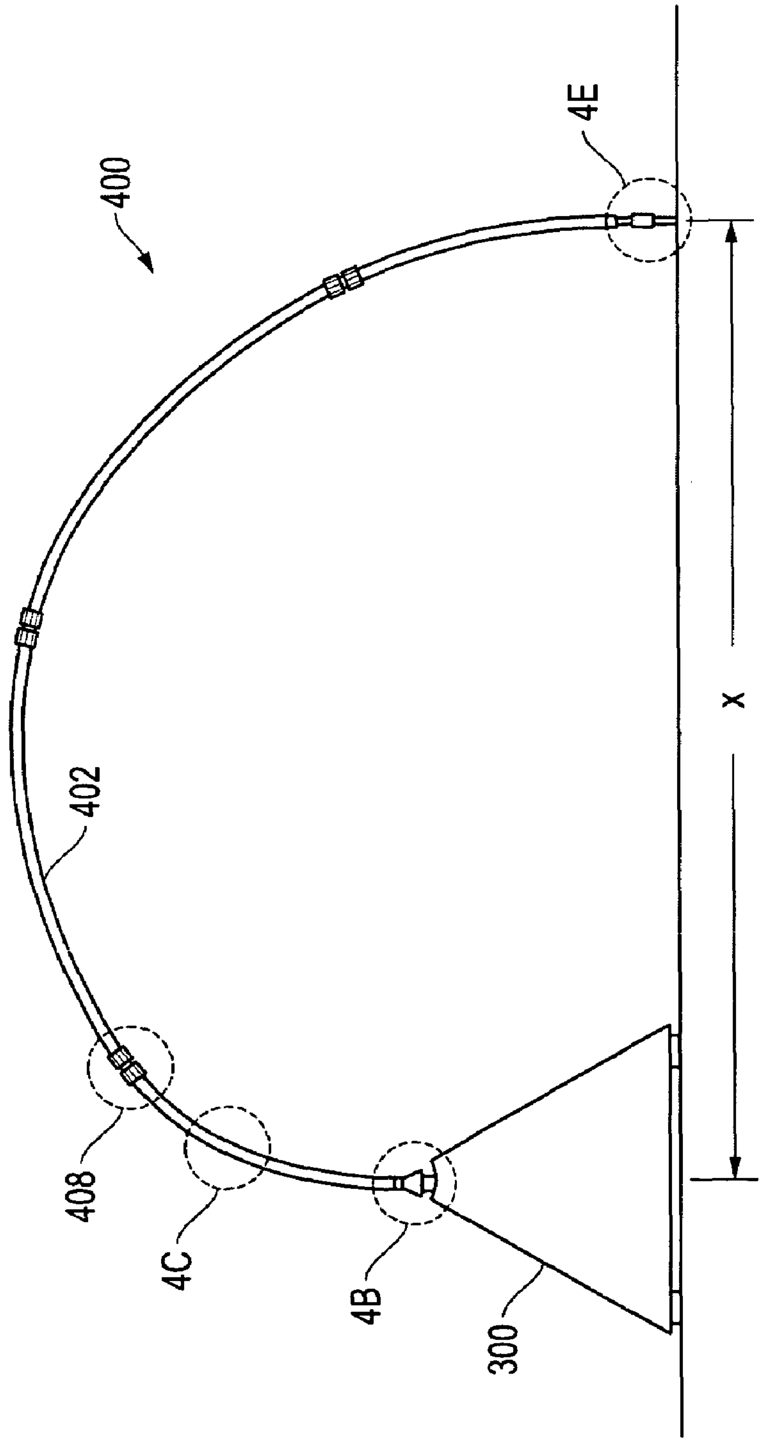
FIGS. 4A-D depicts a waveguide assembly coupling to a source assembly
Figure 4B:
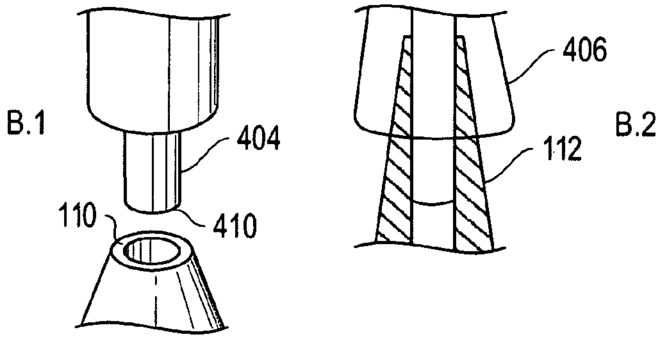
Figure 4C:
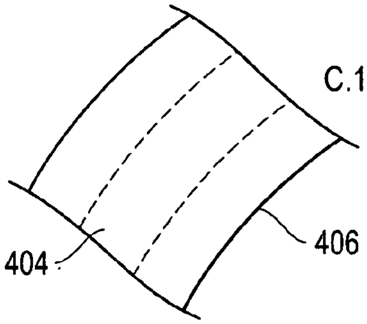
Figure 4E:
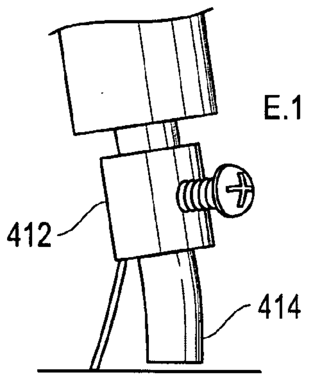
Figure 4D:
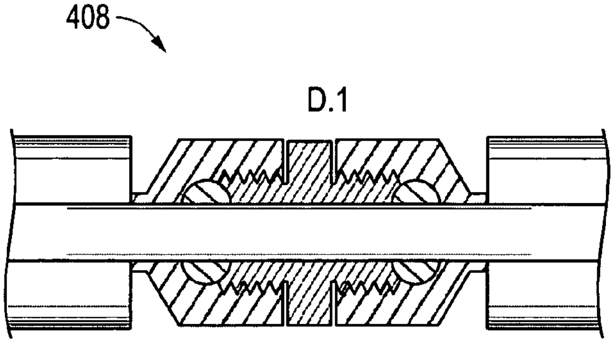

FIG. 3 shows an assembly 300 comprising the source 100 placed within the enclosure 200 such that exit aperture 110 of source 100 exits through the opening 210 of enclosure 200. Enclosure 200 is filled with sound absorbing material 302 which may be fiberglass, polyester, fiberfill, loose denim fill, or other material now known or to be developed. Electrical wiring 304 passing through a bottom 306 of enclosure 200 connects the compression drive of source 100 to an amplifier. Screws 308 connect the bottom 306 to the enclosure 200.

FIG. 4 shows an apparatus 400 comprising assembly 300 connected to a waveguide assembly 402. Detail B.1 shows that an end 410 of the waveguide interior tube 404 inserts into exit aperture 110 of source 100. Detail B.2 shows the outer tube 406 of waveguide assembly 402 extends over the exterior 112 of the throat adapter 106. Detail C.1 show that waveguide assembly 402 comprises an inner tube 404 surrounded by an outer tube 406. In one embodiment, the inner tube is ¼ inch outer diameter steel tube and the outer tube is a flexible vinyl tube used for damping breakout noise from the waveguide. Detail D.1 shows a coupling 408 for connecting two lengths of waveguide together. The tube coupling is optional and allows the waveguide to be broken down into smaller segments for easier transportation. The coupling maintains a constant inner diameter for the waveguide. Detail E.1 shows a far end of the waveguide assembly with a leg attachment 412 for positioning the end 414 of waveguide assembly 402 just above a reflecting plane of a hemi-anechoic chamber. The sound emanates from end 414 and reflects off the reflecting plane. The height of the opening 414 is adjustable by adjusting leg attachment 412. By varying the height, the directivity of the source can be varied to some extent. The leg attachment is small so as not to disturb the directivity of the source.

Figure 5A:
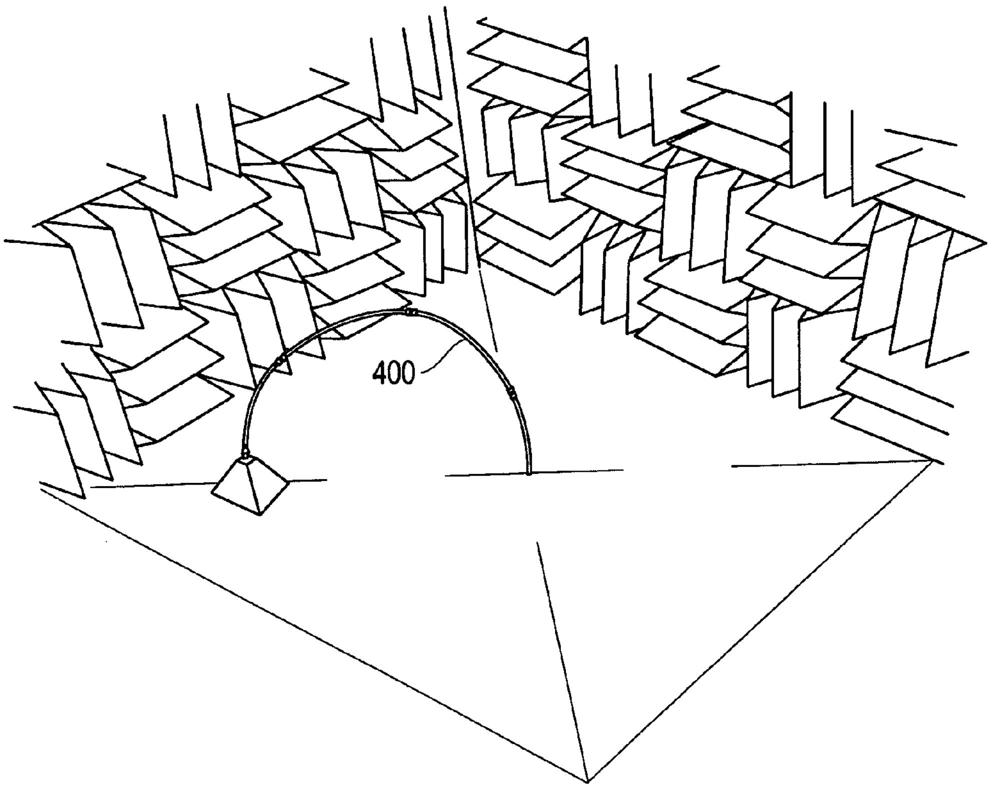
FIGS. 5A-B depicts a hemi-anechoic chamber showing an in-chamber position.
Figure 5B:
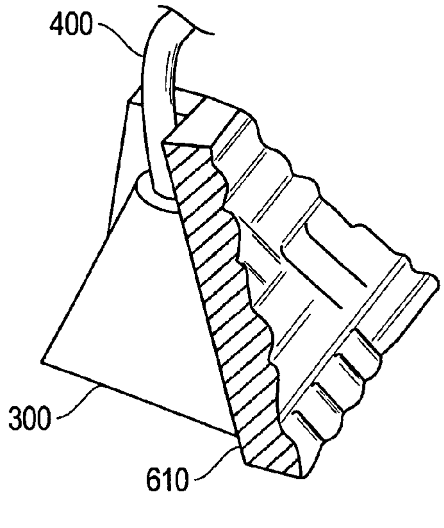

FIG. 5 shows the source mounted inside a hemi-anechoic chamber. The source apparatus 400 comprises source assembly 300 and waveguide assembly 402. Configuration A has the source assembly placed on the reflecting plane with the waveguide assembly terminating above the reflecting plane at or near the center of the reflecting plane. Configuration B is the same as configuration A except that the source assembly is enclosed in sound absorbing material. This is done to reduce the impact of the presence of the source on the acoustic field in the chamber.

Figure 6A:
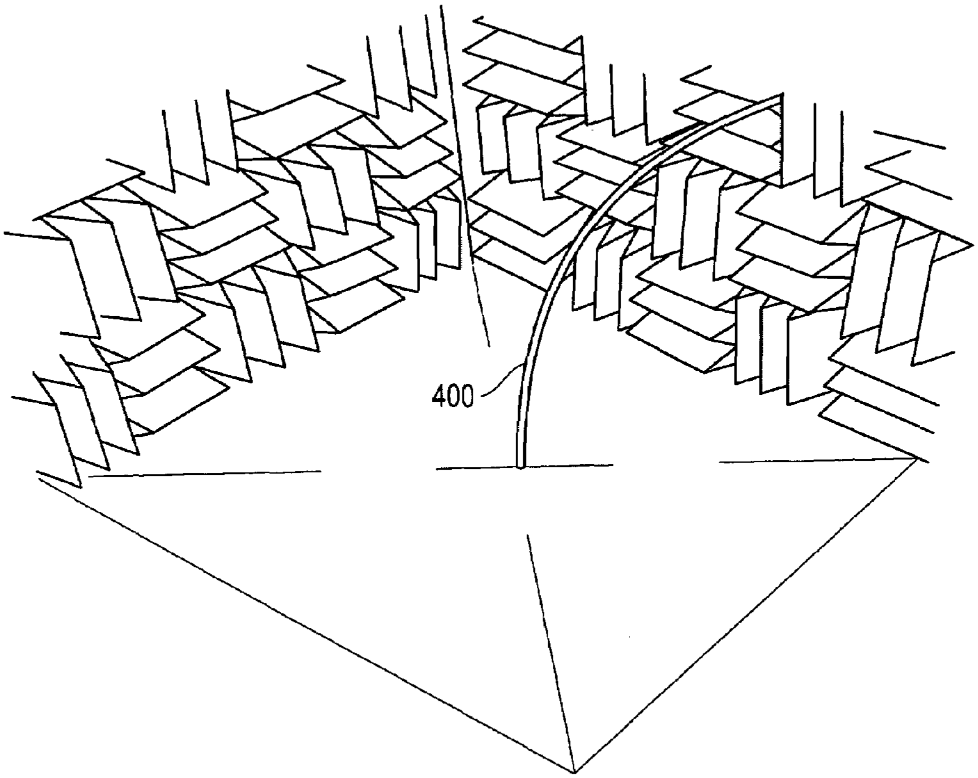
FIGS. 6A-B depicts a hemi-anechoic chamber showing a through-wall position
Figure 6B:
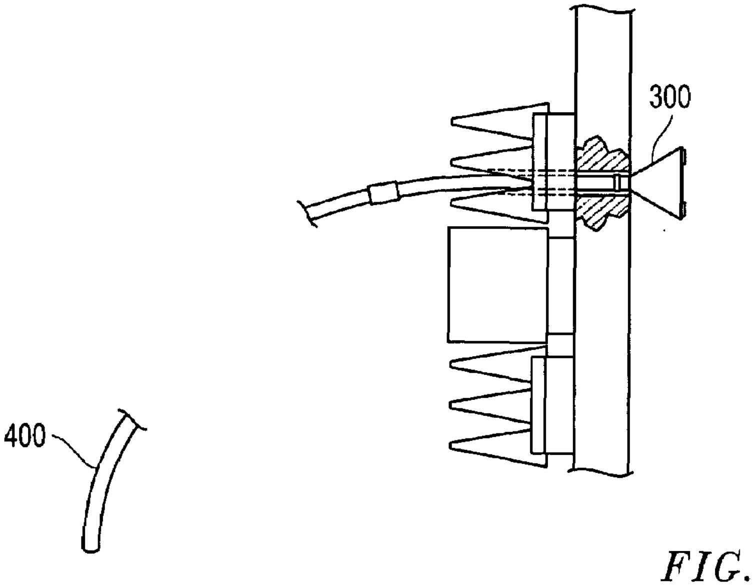
Figure 7A:
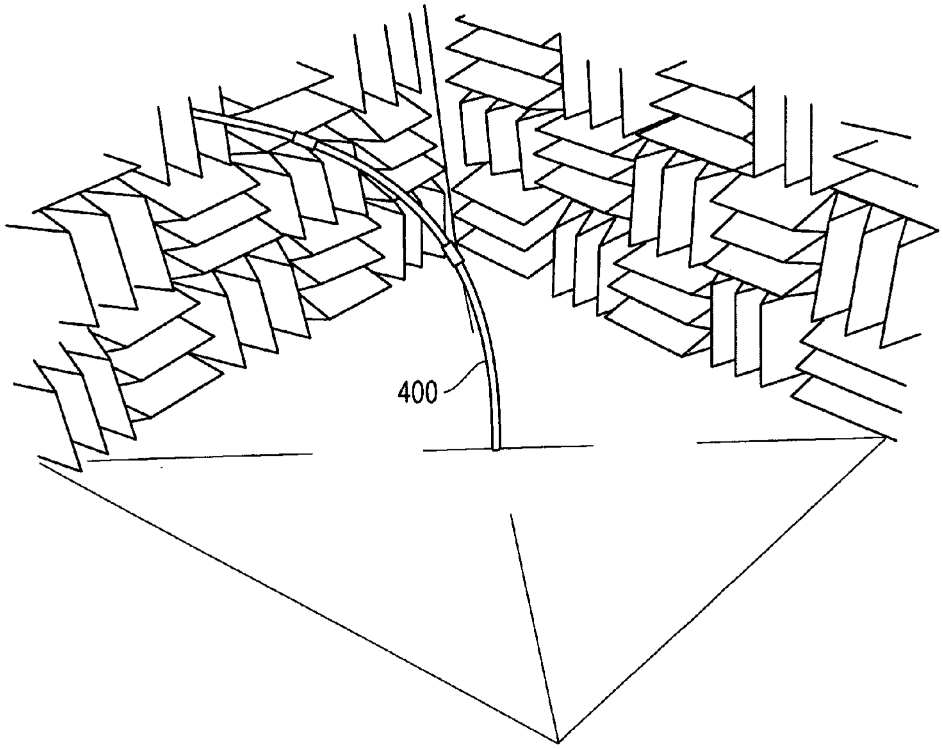
FIGS. 7A-B depicts a hemi-anechoic chamber showing an inside-wedge position
Figure 7B:
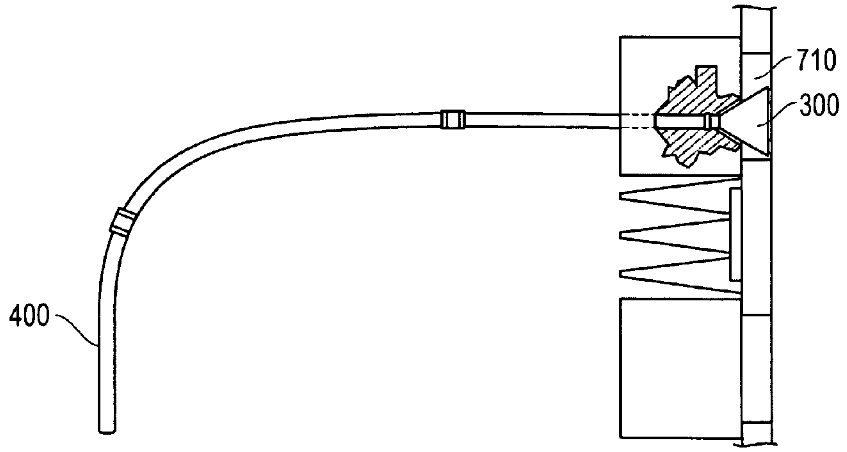

FIG. 6 shows a through-wall mounting configuration. This configuration places the source assembly 300 outside the chamber with the waveguide assembly 400 extending into the chamber terminating at or near the center of the reflecting plane. In the configuration of FIG. 6, the waveguide 400 enters the room through a side wall of the hemi-anechoic chamber making an arc from the side wall to the termination just above the reflecting plane. In another configuration, the waveguide enters the room through the ceiling and extends straight down and terminates at or near the center of the reflecting plane. FIG. 7 shows enclosure of the source assembly 300 within absorbing material 710. In particular, the source is positioned within the anechoic wedges lining the walls of the chamber. In FIG. 7, the waveguide 400 extends from source assembly 300 to a position about at the floor in the center.

Thus, some embodiments comprise a method for producing an acoustic source for use in a sound chamber having a reflecting plane and absorber-lined walls. The method comprises positioning a source assembly outside a measurement hemisphere. The method further comprises coupling the source assembly to a waveguide that carries sound from the source assembly into the measurement hemisphere to emanate sound at a waveguide end. The method also comprises positioning the waveguide end from which sound emanates to be close to the reflecting plane and away from the absorber-lined walls of the chamber. The method may further comprise adjusting the height of the waveguide end above the reflecting plane to vary the directivity of the source. In some embodiments, the source assembly is positioned on a wall that is lined with absorber. In some embodiments, the source assembly is positioned exterior to the chamber. In some embodiments, the source assembly is positioned on the reflecting plane. The source assembly may be covered with sound absorbing material. The waveguide end may be mounted near the center of the reflecting plane.

Another embodiment is an acoustic source in a sound chamber having a reflecting plane and absorber-lined walls. The acoustic source comprises a source assembly positioned outside a measurement hemisphere. The source also comprises a waveguide assembly coupled to the source assembly that guides sound from the source assembly into the measurement hemisphere to emanate sound at a waveguide end. The waveguide end is positionable near the center of the reflecting plane and positionable away from the reflecting plane by an amount less than a wavelength at a highest frequency of interest. The waveguide assembly further comprises a height adjustment mechanism to adjust the height of the waveguide end away from the reflecting plane. The waveguide assembly may comprise two or more sections of waveguide coupled by couplers. In some embodiments, a waveguide outer diameter is about a fourth of the diameter of a throat of a compression driver of the source assembly. In some embodiments, the opening of the waveguide end is small enough and close enough to the reflecting plane to substantially appear to be a point source.

Note that excitation of the compression driver has not been specified and embodiments are not limited to a particular excitation. For example, the excitation may be chosen to produce broadband noise or discrete tones.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for producing an acoustic source for use in a sound chamber having a reflecting plane and absorber-lined walls, comprising:

positioning a source assembly outside a measurement hemisphere;

coupling the source assembly to a waveguide that carries sound from the source assembly into the measurement hemisphere to emanate sound at a waveguide end; and positioning the waveguide end from which sound emanates to be close to the reflecting plane and away from the absorber-lined walls of the chamber.

2. The method of claim 1, wherein the height of the waveguide end above the reflecting plane is adjustable to vary the directivity of the source.

3. The method of claim 1, wherein the source assembly is positioned on a wall that is lined with absorber.

4. The method of claim 1, wherein the source assembly is positioned exterior to the chamber.

5. The method of claim 1, wherein the source assembly is positioned on the reflecting plane.

6. The method of claim 5, wherein the source assembly is covered with sound absorbing material.

7. The method of claim 1, wherein the waveguide end is mounted near the center of the reflecting plane.

8. An acoustic source for use in a sound chamber having a reflecting plane and absorber-lined walls, the acoustic source comprising:

a source assembly positioned outside a measurement hemisphere;

a waveguide assembly coupled to the source assembly that guides sound from the source assembly into the measurement hemisphere to emanate sound at a waveguide end positionable near the center of the reflecting plane and away from the reflecting plane by an amount less than a wavelength at a highest frequency of interest.

9. The source of claim 8, wherein the waveguide assembly further comprises a height adjustment mechanism to adjust the height of the waveguide end away from the reflecting plane.

10. The source of claim 8, wherein the waveguide assembly comprises two or more sections of waveguide coupled by couplers.

11. The source of claim 8, wherein a waveguide outer diameter is about a fourth of the diameter of a throat of a compression driver of the source assembly.

12. The source of claim 8, wherein the source assembly comprises a compression driver and adapter to channel the throat of the compression driver to a smaller diameter exit aperture of the adapter.

13. The source of claim 8, wherein the opening of the waveguide end is small enough and close enough to the reflecting plane to substantially appear to be a point source.

14. The source of claim 8, wherein the source assembly is positioned on a wall of the chamber.

15. A method for producing an acoustic source for use in a sound chamber having a reflecting plane and absorber-lined walls, comprising:

positioning a source assembly outside a measurement hemisphere; the source assembly comprising a compression driver and adapter almost totally encompassed by sound absorbing material and with an exit aperture for coupling to a waveguide assembly;

coupling the source assembly to a waveguide assembly that guides sound from the source assembly into the measurement hemisphere to emanate sound at a waveguide end; and positioning the waveguide end from which sound emanates to be an adjustable distance from the reflecting plane.

16. The method of claim 15, wherein the source assembly is positioned on a wall that is lined with absorber.

17. The method of claim 15, wherein the source assembly is positioned exterior to the chamber.

18. The method of claim 15, wherein the source assembly is positioned on the reflecting plane.

19. The method of claim 15, wherein the opening of the waveguide end is small enough and close enough to the reflecting plane to substantially appear to be a point source.

* * * * *